United States Patent
Mustafi et al.

(10) Patent No.: US 11,833,520 B2
(45) Date of Patent: Dec. 5, 2023

(54) DRY PREPARATION OF KAOLIN IN THE PRODUCTION OF HPA

(71) Applicant: SMS group GmbH, Düsseldorf (DE)

(72) Inventors: Emir Mustafi, Erkrath (DE); Joachim Gier-Zucketto, Würselen (DE); Thorsten Schriewer, Ruhr (DE); Raffael Stastny, Vienna (AT)

(73) Assignee: SMS group GmbH, Düsseldorf (DE)

( * ) Notice: Subject to any disclaimer, the term of this patent is extended or adjusted under 35 U.S.C. 154(b) by 464 days.

(21) Appl. No.: 17/250,152

(22) PCT Filed: Jun. 11, 2019

(86) PCT No.: PCT/EP2019/065154
§ 371 (c)(1),
(2) Date: Dec. 7, 2020

(87) PCT Pub. No.: WO2019/234257
PCT Pub. Date: Dec. 12, 2019

(65) Prior Publication Data
US 2021/0260597 A1    Aug. 26, 2021

(30) Foreign Application Priority Data

Jun. 8, 2018 (DE) .................. 10 2018 209 210.9
Jan. 9, 2019 (DE) .................. 10 2019 200 191.2

(51) Int. Cl.
*B02C 15/00* (2006.01)
*B02C 23/30* (2006.01)
(Continued)

(52) U.S. Cl.
CPC ............ *B02C 15/007* (2013.01); *B02C 23/30* (2013.01); *B02C 23/32* (2013.01); *C04B 33/04* (2013.01);
(Continued)

(58) Field of Classification Search
CPC .................. B02C 15/007; B02C 15/00; B02C 2015/002
See application file for complete search history.

(56) References Cited

U.S. PATENT DOCUMENTS 4,483,487 A * 11/1984 Katsuta .................. B02C 15/04
241/285.3
4,489,895 A * 12/1984 Petersen ................. B02C 23/30
241/19
(Continued)

FOREIGN PATENT DOCUMENTS

| CN | 1189848 A | 8/1998 |
|---|---|---|
| CN | 102655964 A | 9/2012 |

(Continued)

OTHER PUBLICATIONS

Entscheidungskriterien für die Trockenaufbereitung von keramischen Rohstoffen und betriebswirtschaftlicher Vergleich mit dem plastischen Aufbereitungsverfahren, Publication data: Ziegel Zeitschrift,, 19990101.
(Continued)

*Primary Examiner* — Faye Francis
(74) *Attorney, Agent, or Firm* — Smartpat PLC

(57) ABSTRACT

A method for preparing raw kaolin (R) uses a milling and separating device (1) which has a milling section (13) and a first separating section (16). The raw kaolin (R) is a material mixture of at least kaolin as a first fraction (F1) and a second fraction (F2) which includes at least quartz. The raw kaolin (R) is supplied to the milling section (13), in which the first fraction (F1) is at least partly removed from the raw kaolin (R) by a grinding process, and the first fraction (F1) is then separated from the second fraction (F2) in the first separating section (16).

13 Claims, 1 Drawing Sheet

(51) Int. Cl.
  *B02C 23/32* (2006.01)
  *C04B 33/04* (2006.01)
  *C04B 35/626* (2006.01)

(52) U.S. Cl.
  CPC .... *C04B 35/6261* (2013.01); *B02C 2015/002* (2013.01)

(56) References Cited

U.S. PATENT DOCUMENTS

| | | | |
|---|---|---|---|
| 4,561,597 A | 12/1985 | Cook et al. | |
| 4,593,860 A | 6/1986 | Cook et al. | |
| 4,714,544 A | 12/1987 | Rybinski et al. | |
| 4,889,289 A | 12/1989 | Lohnherr et al. | |
| 4,981,269 A | 1/1991 | Koga et al. | |
| 5,003,891 A * | 4/1991 | Kaneko | B02C 23/32 110/341 |
| 5,238,193 A | 8/1993 | Pearce | |
| 5,251,831 A * | 10/1993 | Yoshida | B02C 23/32 241/117 |
| 5,381,968 A * | 1/1995 | Lohnherr | B02C 23/32 241/24.1 |
| 5,624,488 A | 4/1997 | Forbus et al. | |
| 5,791,490 A | 8/1998 | Heinemann et al. | |
| 5,819,947 A * | 10/1998 | Nardi | B02C 15/001 209/714 |
| 6,820,829 B1 * | 11/2004 | Oder | F23K 1/00 241/119 |
| 6,827,221 B1 * | 12/2004 | Brundiek | B02C 23/32 209/208 |
| 6,966,508 B2 * | 11/2005 | Levy | B07B 7/08 241/119 |
| 7,124,968 B2 * | 10/2006 | Oder | F23K 1/00 241/24.31 |
| 7,690,591 B2 * | 4/2010 | Baetz | B02C 15/001 241/119 |
| 2005/0145732 A1 | 7/2005 | Oder et al. | |
| 2009/0200409 A1 | 8/2009 | Neumann et al. | |
| 2012/0256026 A1 | 10/2012 | Matsukawa | |

FOREIGN PATENT DOCUMENTS

| | | | | |
|---|---|---|---|---|
| CN | 108046750 A | 5/2018 | | |
| CZ | 2013446 A3 | 12/2014 | | |
| CZ | 306516 | 2/2017 | | |
| DE | 1088404 B | 9/1960 | | |
| DE | 3921986 C1 | 10/1990 | | |
| DE | 19606672 A1 | 8/1997 | | |
| DE | 69030020 | 10/1997 | | |
| DE | 19806895 A1 | 9/1999 | | |
| DE | 102006028547 A1 | 12/2007 | | |
| EP | 0292739 B1 | 3/1991 | | |
| EP | 0193109 B1 | 12/1991 | | |
| EP | 0510890 B1 | 7/1995 | | |
| GB | 2193115 A * | 2/1988 | ........... | B02C 15/001 |
| JP | S5150059 A | 5/1976 | | |
| JP | S586247 A | 1/1983 | | |
| JP | S5836652 A | 3/1983 | | |
| JP | H03151059 A | 6/1991 | | |
| JP | H0538460 U | 2/1993 | | |
| JP | H0557205 A | 3/1993 | | |
| JP | 2017513709 A | 6/2017 | | |
| RU | 2187387 C1 | 8/2002 | | |
| WO | 0162391 A1 | 8/2001 | | |
| WO | 03028893 A1 | 4/2003 | | |
| WO | 2015051925 A1 | 4/2015 | | |
| WO | WO-2015051925 A1 * | 4/2015 | ............. | B02C 15/04 |

OTHER PUBLICATIONS

Felix Kahr, on behalf of Gebr. Pfeiffer SE, Opposition to European Patent No. 3 802 457.
Metallgewinnung und Umwandlung von LD-Schlacke in hochreaktive Zementkomponenten Metal recovery and conversion of steel slag into highly reactive cement components, Authors: Holger Wulfert, Michael Keyssner, Horst Michael Ludwig, Burkart Adamczyk, Publication data: ZKG International—Zement—Kalk—Gips International,,20130901,Bauverlag BV GmbH, DE, Source info: vol. 66, Nr: 9, pp. 34-40.
Schonbach, Bernard H. "High efficiency separators in roller mills." World cement 19, No. 11 (1988): 436-44.
Wikipedia "Tonminerale" May 11, 2018, https://de.wikipedia.org/w/index.php?title=Tonminerale&oldid=177342246. Linked English-language article retrieved Jan. 4, 2023.
Wikipedia, "Sand", May 29, 2018, https://de.wikipedia.org/w/index.php?title=Sand&oldid=177851523. Linked English-language article retrieved Jan. 4, 2023.

* cited by examiner

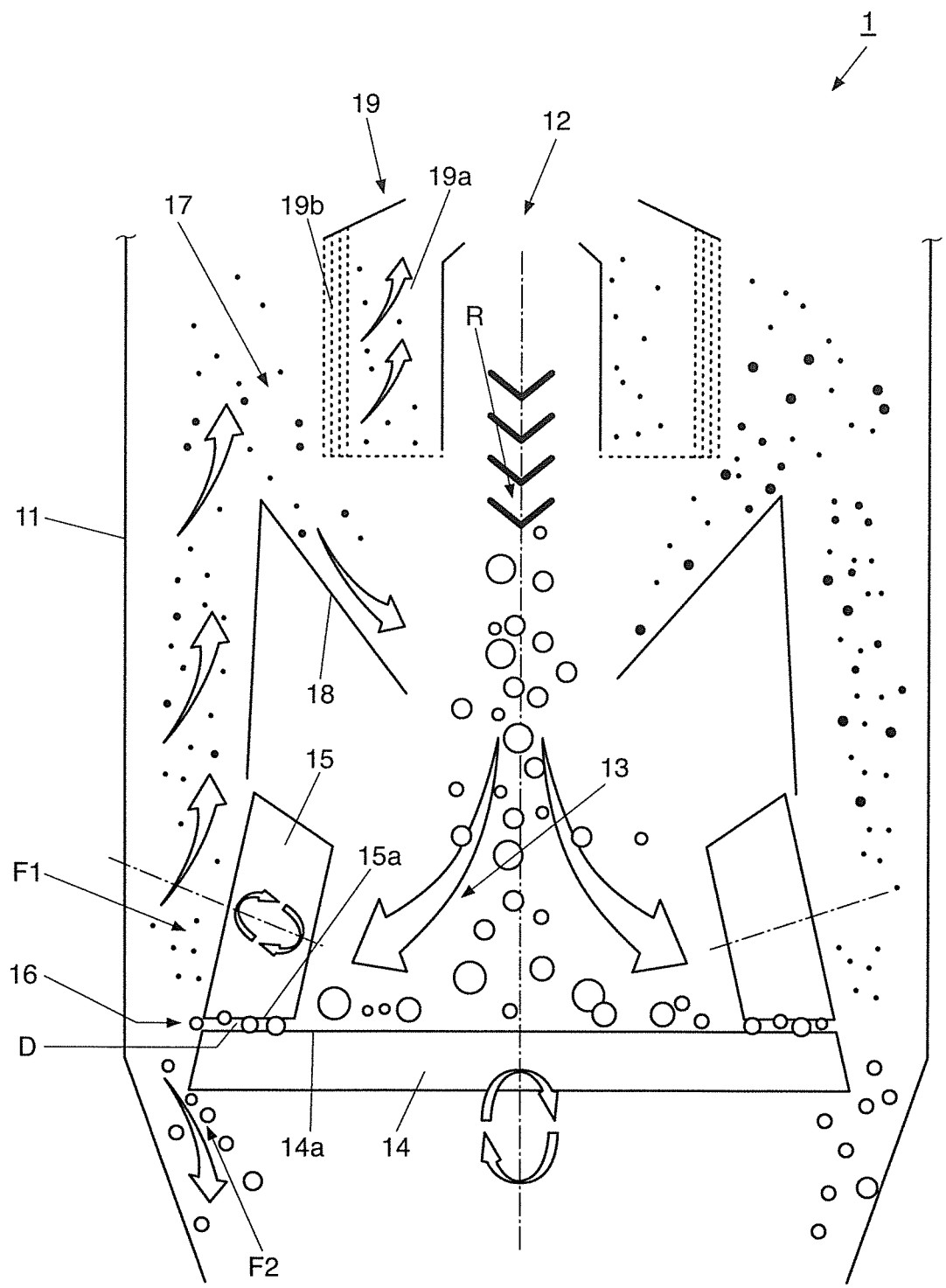

DRY PREPARATION OF KAOLIN IN THE PRODUCTION OF HPA

TECHNICAL FIELD

The disclosure relates to a method for the preparation of raw kaolin, which is a material mixture of at least kaolin as a first fraction and a second fraction preferably comprising quartz.

BACKGROUND

Kaolin, also known as "china clay" or "porcelain clay," is a naturally occurring industrial mineral that is used in a wide variety of applications, such as in the ceramics, plastics and paper industries, in the production of varnishes, paints and rubber, and in the cosmetics and pharmaceuticals industries. Due to its high alumina content, kaolin also functions as a raw material carrier for high-purity alumina (HPA). HPA is becoming increasingly important due to applications in electronics, for example in the manufacture of LED lights and displays.

Kaolin is extracted from a degradation product known as "raw kaolin," which is mostly consists substantially of pure kaolin, also known as "kaolinite," quartz and mica. The conventional process for obtaining kaolin is based on wet processing. For this purpose, the raw kaolin, after being mechanically crushed by a crusher, is slurried in a washing drum, whereby a suspension of the raw material is produced. Quartz sand and coarse mica precipitate out. The kaolin fraction is wet-sieved through a multi-deck sieve. In order to increase the yield, the product can be separated again by means of hydrocyclones. Typically, further sieving is performed to achieve grain bands of well-defined grain or particle sizes and/or to remove impurities and residues before the processed kaolin is recovered as a solid from the aqueous solution. This takes place in a complex process with the assistance of filter presses.

Known wet processes for the preparation of raw kaolin are described in, for example, DE 1 088 404 A, DE 690 30 020 T2 and EP 0 193 109 B1.

The production and processing of the raw kaolin suspension, along with the recovery of the kaolin as a solid, are costly in terms of resources and energy. The process is complex. The time required and the necessary resources and costs cannot easily be reduced.

WO 2015/051925 A describes a method and a device for preparation and separation of a material from a compound multiple material system. CN 108046750 A describes a production method for superfine calcinated kaolin powder. EP 0 510 890 A2 describes a device for dry grinding of solids. RU 2 187 387 C1 describes a method for dry enrichment of non-metallic minerals such as kaolin. CZ 2013-446 A3 describes a method for production and use of kaolin-mica.

SUMMARY

An object of the disclosure is to improve the preparation of raw kaolin, in particular to reduce the time required and the consumption of resources and energy.

The object is achieved with a method for the preparation of raw kaolin as claimed. Advantageous developments arise from the subclaims, the following illustration of the invention and the description of preferred embodiments.

The method serves for the preparation of raw kaolin, which is a material mixture of at least kaolin or kaolinite as a first fraction and a second fraction comprising at least quartz.

The designations "kaolin" and "kaolinite" are used synonymously herein and denote the layered silicate known below, which is part of the kaolinite-serpentine group and has the crystal chemical composition $Al4[(OH)8|Si4O10]$. The two fractions consist of particles, which in this context means granular aggregates of the corresponding components. Due to the composition of the raw kaolin defined above, the particles of the first fraction tend to be lighter or finer than the particles of the second fraction. "Preparation" in this context means, in particular, the separation of the kaolin from other components of the raw kaolin, in particular quartz and possibly mica. Furthermore, preparation can include the production of certain particle or grain sizes of the kaolin.

The preparation of the raw kaolin is carried out at least partially in a milling and separating device, which has a milling section and a first separating section. It should be noted that the designations of "first" and "second" do not imply any order, sequence or the like, but serve only for linguistic differentiation.

The raw kaolin is initially fed to the milling section, in which the first fraction is at least in part, but preferably substantially completely, extracted from the raw kaolin by means of pulverizing. For this purpose, the milling and separating device can have a feed section by way of which the raw kaolin is fed through an interior of the device defined by an enclosure. The milling and separating device can have an approximately axially symmetrical construction, wherein in this case the feed section is preferably located centrally in the upper area of the device, so that the raw kaolin is transported into the interior of the milling and separating device substantially centrally in the direction of gravitational force. It should be noted that the designations "upper," "lower" and the like are to be seen relative to the direction of gravitational force and are well-defined by the intended use of the milling and separating device.

After the raw kaolin has been ground in the milling section and the first fraction extracted from the raw kaolin, the first fraction is separated from the second fraction in the first separating section.

The preparation process with the assistance of the milling and separating device completely dispenses with a costly wet phase. Various process steps, such as filtration and calcination/drying of the product, can be omitted in the preparation of kaolin, including the possible production of high-purity aluminum oxide. This makes it possible to realize a significant simplification of the preparation process. The process conserves energy and resources and can be carried out cost-effectively.

Since the preparation described herein does not require a costly wet phase, this—in particular the milling and separation of the first fraction from the second fraction and the selection according to the fineness of the particles—is preferably carried out without producing a suspension from the raw kaolin.

Preferably, the separation in the first separating section is carried out by means of a gas flow, for example air flow, which has a (vector) component against the direction of gravity. The gas flow is thus at least partially, but preferably substantially completely, directed oppositely to the direction of gravity. According to this preferred embodiment the gas flow is in addition arranged so that the kaolin particles of the first fraction are at least in part carried away by the gas flow, while the particles of the second fraction fall downwards against or out of the gas flow. The gas flow can be generated by a blower and directed by suitable guiding means (enclosure of the device, guide plates, etc.) in such a manner that the separation of the first fraction from the second fraction takes place. As a result, the flow parameters, such as volume flow, flow velocity or the like, can be optimized for the separation of the kaolin from the second fraction. Separability by means of a gas flow is provided by the different masses or densities of the particles of the two fractions. Thus, a separation that is reliable and conserves energy and resources can be realized.

The milling section preferably comprises: a rotatable grinding table with a table grinding surface and at least one, preferably several, similarly rotatable, cylindrical grinding rolls with a roll grinding surface, which faces the grinding table and is spaced from the table grinding surface by a gap. In this manner, a mill is implemented which is suitable for the breaking down of raw kaolin, is structurally compact and can be operated reliably. The grinding rolls are preferably located in the region of the outer circumference of the grinding table. Furthermore, the roll grinding surfaces are preferably beveled, i.e. they are preferably not perpendicular to the cylinder axis of the associated grinding roll.

The gap is preferably adjustable. This can be achieved by a suitable bearing arrangement of the grinding rolls, such that their locations and/or positions relative to the grinding table and/or the contact pressure of the grinding rolls on the grinding table can be changed or adjusted. In this manner, a selective comminution is achievable, which makes it possible to carry out, in an effective manner, separation of kaolin/quartz by a subsequent sifting process. Moreover, by adjusting the process parameters, such as contact pressure of the grinding rolls, mass flow of the ground material, volume flow to the sifter, drying temperature, etc., an optimal classification or sieving of the kaolin can be achieved.

The grinding table and the grinding rolls preferably work together as follows for optimal crushing and separation: Initially, the raw kaolin is delivered to the table grinding surface. Due to the rotation of the grinding table, the raw kaolin is transported outwardly and subsequently enters the gap between the table grinding surface and the roll grinding surface, which preferably rotate in opposite sense, whereby the raw kaolin is pulverized and the first fraction is extracted at least in part from the raw kaolin.

Preferably, the milling and separating device has a second separating section in which a selection of the first fraction according to particle size takes place. In other words, the fineness of the particles of the first fraction, i.e. the fineness of the kaolin particles, can be adjusted by means of the second separating section.

For this purpose, the second separating section preferably comprises one or more deflecting plates and a sifter, which is, for example, a rod basket sifter. The sifter has a collecting chamber and one or more sieve-like outer wall sections with several openings through which a part of the particles of the first fraction can pass in order to enter the collecting chamber, whilst another part of the particles of the first fraction is deflected by the outer wall sections of the sifter and the deflecting plates and conducted back to the milling section. The nature of the sifter, in particular its openings, thus determines the particle sizes to be filtered out. Kaolin particles of the desired sizes enter the collecting chamber, whilst particles of too large a diameter run through a further grinding process.

Preferably, the gas flow, which carries away the particles of the first fraction in upward direction due to the low weight, is directed towards the sifter, making selection by particle size particularly effective and reliable.

Preferably, the sifter is provided to be rotatable, wherein the rotational speed is adjustable, whereby the desired fineness of the particles of the first fraction to be filtered out can be adjusted in simple manner.

Further advantages and features of the present invention are apparent from the following description of preferred embodiments. The features described therein can be realized alone or in combination with one or more of the above-mentioned features insofar as the features are not in conflict. The following description of the preferred embodiments is made with reference to the accompanying drawing.

BRIEF DESCRIPTION OF THE DRAWINGS

FIG. 1 is a schematic illustration of a milling and separating device for the dry preparation of kaolin.

DETAILED DESCRIPTION

In the following, preferred embodiments are described on the basis of the FIGURE.

FIG. 1 is a schematic illustration of a milling and separating device 1 for the dry preparation of kaolin.

The milling and separating device 1 has an interior defined by an enclosure 11 and a feed section 12, via which the raw kaolin R, which is preferably a mixture of at least kaolin and quartz, is fed to the interior. In the example of FIG. 1, the milling and separating device 1 has an approximately axially symmetrical construction, wherein the feed section 12 is located centrally in the upper region of the device, such that the raw kaolin R is transported into the interior of the milling and separating device 1 substantially centrally in the direction of gravitational force. However, the feed section 12 can also be arranged laterally or in some other manner, as long as the raw kaolin R enters the interior and can be fed for further processing.

The milling and separating device 1 also has a milling section 13, which in the embodiment of FIG. 1 comprises a rotatable grinding table 14 with a table grinding surface 14a and a plurality of similarly rotatable, cylindrical grinding rolls 15. The cylindrical grinding rolls 15 each have a beveled roll grinding surface 15a, which faces the grinding table 14 and is spaced from the table grinding surface 14a by a gap D. The grinding rolls 15 are located in the region of the outer circumference of the grinding table 14 and co-operate with the grinding table 14 as follows:

The raw kaolin R fed via the feed section 12 falls onto the grinding table 14 and is transported outwardly due to the rotation of the latter. The raw kaolin R goes into the gap D between the two grinding surfaces 14a and 15a, which preferably rotate in opposite sense. In this manner, the raw kaolin R is pulverized, resulting in separation into a first fraction F1, which is a fine or light fraction, and a second fraction F2, which is a heavy or coarse fraction relative to the first fraction F1. The second fraction F2 comprises at least quartz; the first fraction F1 consists substantially of the kaolin that is released.

The grinding rolls 15 are preferably individually adjustable. In particular, the gap D is preferably variable in order to be able to vary the contact pressure during the pulverizing. In addition, the speed of rotation, position and/or location of the grinding rolls 15 can be organized individually or in groups, and/or the speed of rotation, location and/or position of the grinding table 14 can be organized to be adjustable.

After the particles of the first and second fractions F1, F2 have outwardly departed from the gap D in the radial direction of the grinding table 14, they enter a gas flow, preferably an air flow, the flow parameters, such as volume flow, flow velocity or the like, of which are adjusted so that a separation of the first fraction F1 from the second fraction F2 takes place. The gas flow can be generated, for example, by a blower (not shown). Particles of the second fraction F2 fall down past the grinding table 14 and are discharged (not shown), and particles of the first fraction F1 are carried along upwards by the gas flow, as shown by arrows in FIG. 1. The separation of the first fraction F1 from the second fraction F2 takes place in a section which is referred to herein as the first separating section 16.

The milling and separating device 1 also has a second separating section 17, which can be used to adjust the fineness of the particles of the first fraction F1, that is, the fineness of the kaolin particles. For this purpose, the second separating section 17 comprises deflecting plates 18 and a rotatable sifter 19, which is preferably a rod basket sifter.

The rod basket sifter 19 is a cylindrical or hollow-cylindrical component, which has a collecting chamber 19a and one or more sieve-like outer wall sections 19b. The outer wall sections 19b are located at least in sections at the outer circumference of the rod basket sifter 19 and have several openings, slots or the like through which particles of a certain size can pass. The gas flow, which carries away the particles of the first fraction F1 in upward direction due to the low weight, is thus preferably directed towards the rod basket sifter 19. A part of the particles of the first fraction F1 passes through the sieve-like outer wall sections 19b into the collecting chamber 19a, from which the kaolin, which has been extracted and pulverized to the desired degree of comminution, can be discharged. Another part of the particles, essentially particles with too large a diameter, is "thrown back" by the outer wall sections 19b and falls down away from the main gas flow. The deflecting plates 18 are arranged in such a manner that the particles rejected by the rod basket sifter 19 fall back onto the grinding table 14 and mix with the feed material from the feed section 12. The fineness of the particles of the first fraction F1, i.e., the prepared kaolin, can be adjusted by means of the rotational speed of the sifter 18.

The dry breaking down or dry preparation of the raw kaolin with the assistance of the milling and separating device 1 completely dispenses with a costly wet phase. With the milling and separating device 1, the contact pressure of the grinding rolls 15 can be varied so that selective crushing can be achieved. This selective crushing makes it possible to separate kaolin and quartz by a subsequent sifting process. Moreover, by adjusting the process parameters, such as contact pressure of the grinding rolls 15, mass flow of the ground material, volume flow to the sifter 19, drying temperature, etc., an optimal classification or sieving of the kaolin can be achieved.

In the preparation of kaolin, up to the production of high-purity aluminum oxide, various process steps, such as filtration and calcination/drying of the product, can be omitted. This makes it possible to significantly simplify the preparation process. The process using the milling and separating device 1 saves energy and resources and can be carried out cost-effectively.

To the extent applicable, all individual features explained in the embodiments can be combined and/or exchanged.

LIST OF REFERENCE SIGNS 1 milling and separating device
11 enclosure
12 feed section
13 milling section
14 grinding table
14a table grinding surface
15 grinding roll
15a roll grinding surface
16 first separating section
17 second separating section
18 deflecting plate
19 sifter
19a collecting chamber
19b outer wall section
R raw kaolin
D gap
F1 first fraction
F2 second fraction

The invention claimed is:
1. A method for preparation of raw kaolin (R), comprising:
providing a roller milling and separating device (1) which has a milling section (13) and a first separating section (16);
providing the raw kaolin (R) as a material mixture comprising a first fraction (F1) including kaolin and a second fraction (F2) including quartz;
feeding the raw kaolin (R) to the milling section (13);
pulverizing the raw kaolin (R) in the milling section (13) and thereby extracting the first fraction (F1) at least in part from the raw kaolin (R); and
subsequently separating the first fraction (F1) from the second fraction (F2) in the first separating section (16), wherein the preparation is carried out without production of a suspension of the raw kaolin (R).
2. The method according to claim 1,
wherein the separation in the first separating section (16) is carried out by a gas flow which has a component opposite to the direction of gravitational force and is so arranged that particles of the first fraction (F1) are carried away at least in part by the gas flow whilst particles of the second fraction (F2) drop down against or out of the gas flow.
3. The method according to claim 1,
wherein the milling section (13) comprises a rotatable grinding table (14) with a grinding table surface (14a) and at least one similarly rotatable, cylindrical grinding roll (15) with a roll grinding surface (15a), which faces the grinding table (14) and is spaced from the grinding table surface (14a) by a gap (D).
4. The method according to claim 3,
wherein the gap (D) is adjustable.
5. The method according to claim 3,
wherein one or more of
positions of the grinding rolls (15) relative to the grinding table (14),
locations of the grinding rolls (15) relative to the grinding table (14), and
a contact pressure of the grinding rolls (15) on the grinding table (14) are adjustable.
6. The method according to claim 3,
wherein the raw kaolin (R) is delivered to the table grinding surface (14a), is transported outwardly due to the rotation of the grinding table (14) and subsequently enters the gap (D) between the table grinding surface (14a) and the roll grinding surface (15a), whereby the raw kaolin (R) is pulverised and the first fraction (F1) is extracted at least in part from the raw kaolin (R).

7. The method according to claim 6,
wherein the table grinding surface (14*a*) and the roll grinding surface (15*a*) rotate in opposite directions.

8. The method according to claim 1,
wherein the milling and separating device (1) has a second separating section (17), in which a selection of the first fraction (F1) according to particle size takes place.

9. The method according to claim 8,
wherein the second separating section (17) comprises one or more deflecting plates (18) and a sifter (19),
wherein the sifter has a collecting chamber (19*a*) and one or more outer wall sections (19*b*) with a plurality of openings through which a part of the particles of the first fraction (F1) can pass so as to enter the collecting chamber (19*a*), whilst another part of the particles of the first fraction (F1) is deflected by the outer wall sections (19*b*) of the sifter (19) as well as the deflecting plates (18) and conducted back into the milling section (13).

10. The method according to claim 9,
wherein the sifter (19) is a rod basket sifter.

11. The method according to claim 9,
wherein the separation in the first separating section (16) is carried out by a gas flow which is directed towards the sifter (19).

12. The method according to claim 9,
wherein the sifter (19) is rotatable.

13. The method according to claim 9,
wherein the sifter (19) is rotatable at an adjustable rotational speed.

* * * * *